March 27, 1945.　　　　J. W. FRENCH　　　　2,372,479
OPTICAL OBSERVATION INSTRUMENT
Filed July 10, 1941
FIG: 1.
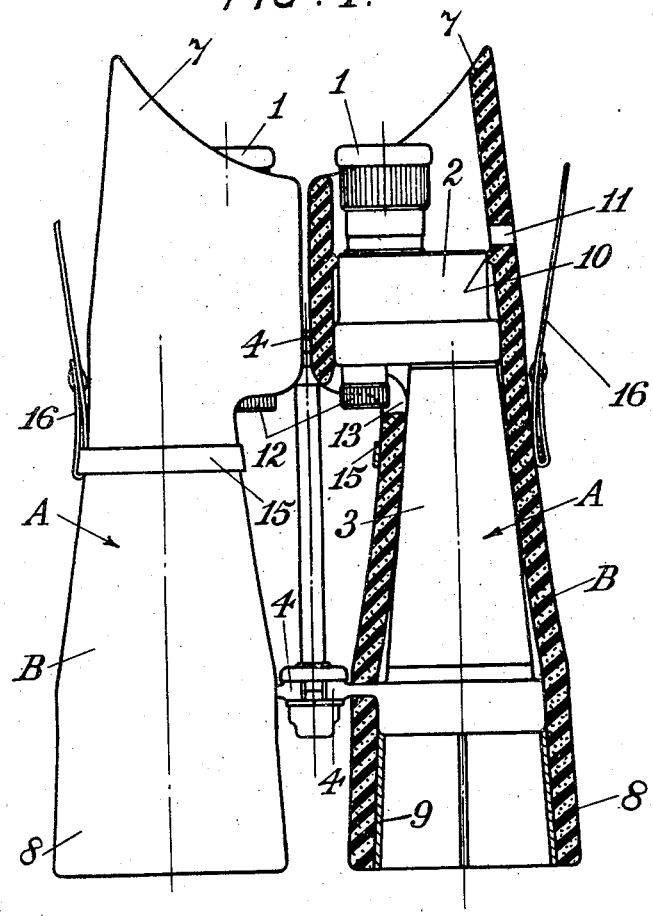
FIG: 2.
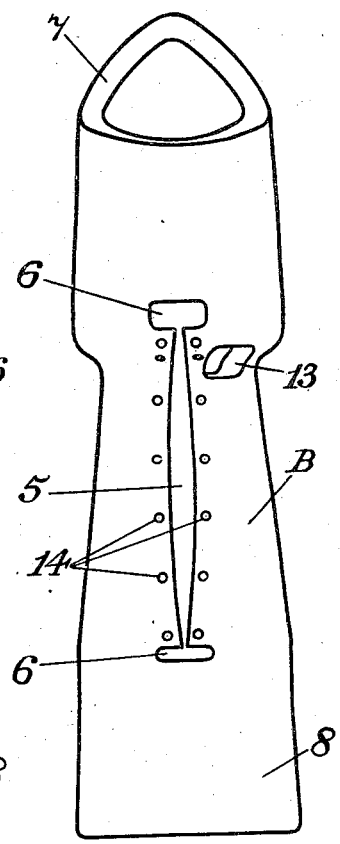
FIG: 5.
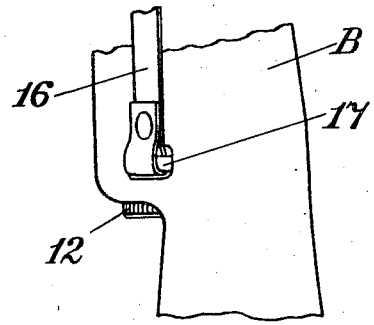
FIG: 3.
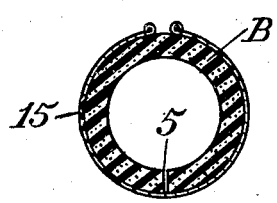
FIG: 4.
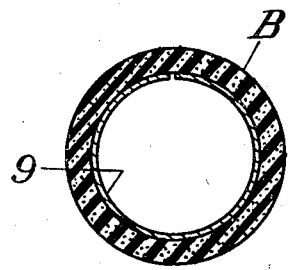
INVENTOR.
JAMES WEIR FRENCH.
By Lancaster, Allwine & Rommel
ATTORNEYS.

Patented Mar. 27, 1945

2,372,479

UNITED STATES PATENT OFFICE 2,372,479

OPTICAL OBSERVATION INSTRUMENT

James Weir French, Anniesland, Glasgow, Scotland, assignor to Barr and Stroud, Limited, Anniesland, Glasgow, Scotland Application July 10, 1941, Serial No. 401,847
In Great Britain May 18, 1940

1 Claim. (Cl. 88—1)

This invention refers to optical observation instruments of the hand-supported or portable type, comprising a tubular body containing optical and other parts, the invention being concerned particularly with ordinary monocular telescopes and binoculars.

Such instruments are liable to rough usage. They are fairly heavy and may be set down violently, allowed to fall, or struck against neighbouring objects. In the case of binoculars, the instrument is frequently slung loosely by a strap round the neck of the observer and is liable to swing and strike heavily against other objects. The purpose of the present invention is to provide for the protection of such instruments.

According to the present invention an instrument of the type referred to is provided with a sheathing of shock-absorbing material which constitutes a protective pad around the instrument body.

Generally the sheathing is composed of rubber, preferably sponge rubber, but it may be composed of waterproofed felt, quilted leather, quilted waterproof fabric, or other waterproof material of sufficient thickness and softness to afford the necessary protection. It can be so designed that no matter how the instrument may be struck against another object and no matter how the instrument may be allowed to fall, the shock is taken by the sheathing.

The sheathing may be in the form of a casing or jacket in one or more than one part, which is readily applicable to and removable from the instrument, or, if composed of rubber or felt, the sheathing may be moulded on to the instrument body to form a permanent part of the instrument.

Instruments with which the invention is concerned have bodies of tubular character, a single tubular body in the case of a monocular instrument and two tubular bodies or limbs in the case of binoculars. Thus, for a monocular telescope instrument, the protective sheathing may be in the form of a single tubular jacket adapted to fit closely round the telescope body, while for binoculars the sheathing may be in the form of two tubular jackets, one to fit closely round each limb, the two jackets being either separate or joined together. Alternatively, for binoculars a single tubular jacket to embrace the two limbs may in some cases be provided.

A protective sheathing of this character may be extended at the objective end of the instrument to form a sunshade, and at the eyepiece end of the instrument may be designed to form a face piece.

An example of construction as applied to a prismatic binocular instrument will now be described with reference to the accompanying drawing, in which:

Figure 1 shows the instrument and protective sheathing as a whole, the sheathing of one limb being shown in section, Figure 2 shows the sheathing for one limb of the instrument, as seen from between the limbs, Figures 3 and 4 are cross-sectional views of the sheathing, the sections being just below the prism casing and near the objective end, respectively, and Figure 5 is a view showing a detail.

The instrument comprises two limbs A, each having an eyepiece tube 1, a prism casing 2, and an objective casing 3, the two limbs being hinged together by hinge brackets 4 for inter-ocular adjustment.

Two separate protective sheaths or jackets B composed of sponge rubber are provided, one for each limb of the instrument. Each of these is of the tubular form shown to conform with the shape of the limb of the instrument, and is of a length greater than the extreme length of the instrument. For a portion of its length corresponding with the distance between the two hinge brackets 4 of the instrument, the sheath B is slit longitudinally at 5, see Figure 2, this slit 5 terminating at each end in an enlarged opening 6.

To apply each of the protective sheaths B to the instrument, the eyepiece tube 1 and prism casing 2 are thrust through the slit 5 and the objective end part of the sheath is sprung over the objective casing 3 of the instrument. In that condition the hinge brackets 4 project laterally from the sheath through the openings 6. At the eyepiece end, the sheaths B form a face piece 7. They also extend beyond the end of the objective casing 3 to form sunshades 8. An expanding metal ring 9 is fitted within the sunshade part 8 to maintain the tubular shape.

The sheath B has an internal annular rib at 10 to bear tightly on the prism casing 2 so as to prevent moisture which has entered the sheath at the face piece from passing farther into the sheath, and a hole 11 is provided in the wall of the sheath through which moisture can be drained out.

Each of the prism casings 2 is shown fitted with a head 12 for the operation of movable colour glasses within the prism casing, and the wall of the sheath is cut away at 13 to expose the heads 12.

Holes 14 are shown along the edges of the slit 5 for lacing, not shown in the drawing, to close the slit. Instead of, or in addition to, such lacing, a spring clasping ring 15 may be provided, to which ring the ends of a neck strap 16 may be attached. The ring 15 may be replaced by a strap fastened around the sheath. As an alternative to lacing, a sliding clasp fastener, not shown in the drawing, may be fitted to the slit 5.

In the modification shown in Figure 5, an eye 17 on the body of the instrument projects through an opening in the sheath and to this eye the neck strap 16 is attached.

In some cases, the sheaths B may be divided for the whole of their length.

I claim:

An optical observation instrument of the hand-carried or portable type comprising a body of tubular character containing optical and other parts and provided with a shock-absorbing sheathing in the form of a tubular jacket of thick, soft, flexible material adapted to fit closely round the instrument body to constitute a protective pad, the sheathing being slit or divided intermediate its ends to allow of its being applied to and removed from the instrument body, and there being means for closing the slit and securing the sheathing around the instrument.

JAMES WEIR FRENCH.